(12) United States Patent
Carew et al.

(10) Patent No.: US 6,874,022 B1
(45) Date of Patent: Mar. 29, 2005

(54) METHOD AND SYSTEM FOR MODELING BEHAVIOR OF ELEMENTS IN A TELECOMMUNICATIONS SYSTEM

(75) Inventors: Anthony J. P. Carew, Austin, TX (US); Curtis C. Hale, Jr., Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/267,506

(22) Filed: Mar. 12, 1999

(51) Int. Cl.[7] .............................................. G06F 15/173
(52) U.S. Cl. ............................ 709/224; 709/221; 714/4
(58) Field of Search ................................ 709/224, 221, 709/223, 202, 226, 242, 220; 714/4; 370/395, 400, 227, 252, 408; 379/201.03; 707/103 R; 340/825.01; 375/222

(56) References Cited

U.S. PATENT DOCUMENTS

| | | | |
|---|---|---|---|
| 5,210,530 A | | 5/1993 | Kammerer et al. ......... 340/825 |
| 5,621,721 A | | 4/1997 | Vatuone ...................... 370/16 |
| 5,678,006 A | | 10/1997 | Valizadeh et al. .......... 395/200 |
| 5,941,955 A | * | 8/1999 | Wilby et al. ................ 709/242 |
| 5,948,063 A | * | 9/1999 | Cooper et al. ............... 709/223 |
| 5,968,122 A | * | 10/1999 | Schlosser et al. ........... 709/223 |
| 5,999,103 A | * | 12/1999 | Croslin ................... 340/825.01 |
| 5,999,565 A | * | 12/1999 | Locklear, Jr. et al. ........ 375/222 |
| 6,163,525 A | * | 12/2000 | Bentall et al. .............. 370/227 |
| 6,349,325 B1 | * | 2/2002 | Newcombe et al. ........ 709/202 |
| 6,349,334 B1 | * | 2/2002 | Faupel et al. ............... 709/224 |
| 6,363,072 B1 | * | 3/2002 | Furuichi ..................... 370/395 |
| 6,366,657 B1 | * | 4/2002 | Yagel et al. ........... 379/201.03 |
| 6,385,201 B1 | * | 5/2002 | Iwata ......................... 370/400 |
| 6,385,650 B1 | * | 5/2002 | Skog et al. ................. 709/226 |
| 6,457,048 B2 | * | 9/2002 | Sondur et al. .............. 709/220 |
| 6,477,539 B1 | * | 11/2002 | Smith ..................... 707/103 R |
| 6,507,565 B1 | * | 1/2003 | Taylor ........................ 370/252 |
| 6,604,208 B1 | * | 8/2003 | Gosselin et al. .............. 714/4 |
| 6,628,661 B1 | * | 9/2003 | Goldman et al. ........... 370/408 |

* cited by examiner

*Primary Examiner*—John Follansbee
*Assistant Examiner*—Jungwon Chang
(74) *Attorney, Agent, or Firm*—Baker Botts L.L.P.

(57) ABSTRACT

A node representing a network element is provided. A service state for the node is stored in the node. A service state for a first parent node upon which the node is operationally dependent is stored in the node. In response to a triggering occurrence, a second parent node is dynamically associated with the node. A service state for the second parent node is stored in the node. In response to receiving a new service state for one of the parent nodes, the service state for the node is redetermined based on the service states for the parent nodes.

18 Claims, 2 Drawing Sheets

METHOD AND SYSTEM FOR MODELING BEHAVIOR OF ELEMENTS IN A TELECOMMUNICATIONS SYSTEM

TECHNICAL FIELD OF THE INVENTION

This invention relates generally to telecommunication systems and more particularly to a method and system for modeling behavior of elements in a telecommunications system.

BACKGROUND OF THE INVENTION

Telecommunications is a rapidly growing industry that affects almost every other major industry. Because of the field's rapid growth, the management of telecommunications systems has become more difficult as the systems have become increasingly larger and more complex. In addition to the problems of monitoring any distributed network, modern telecommunications systems include components with multiple line cards and shelves, embedded intelligent systems, and other complexities making them difficult to monitor. All of these components must be monitored for operational and business-related reasons.

Traditional methods for monitoring these complex, distributed telecommunications systems have proven unsuccessful. Recently, behavioral modeling has been employed to improve monitoring systems. However, even these methods are not able to monitor, log and analyze resource use and failures with the desired accuracy. These methods are limited to modeling physical equipment in the field and unduly restrict relationships between resources so that real-world systems cannot be accurately modeled.

SUMMARY OF THE INVENTION

In accordance with the present invention, a method and system for modeling behavior of elements in a telecommunications system are provided that substantially eliminate or reduce the disadvantages or problems associated with previously developed methods and systems. In particular, the present invention provides more accuracy by allowing all elements and relationships in a telecommunications system to be modeled.

In one embodiment of the present invention, a node representing a network element is provided. A service state for the node is stored in the node. A service state for a first parent node upon which the node is operationally dependent is stored in the node. In response to a triggering occurrence, a second parent node is dynamically associated with the node. A service state for the second parent node is stored in the node. In response to receiving a new service state for one of the parent nodes, the service state for the node is redetermined based on the service states for the parent nodes.

Technical advantages of the present invention include providing an improved method and system for modeling the behavior of elements in a telecommunications system. In particular, both physical and logical elements are modeled with physical relationships and logical associations, and nodes are dynamically created and deleted using dynamic links between nodes. This allows monitoring of not only permanent, physical relationships, but also temporary relationships such as during back-up or failure and also logical relationships not based on physical equipment such as those relating to commercial factors. In addition, nodes may be operationally dependent upon a plurality of other nodes which more accurately reflects real-world conditions. As a result, complete modeling of a system is accomplished, including the status of all equipment and services.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
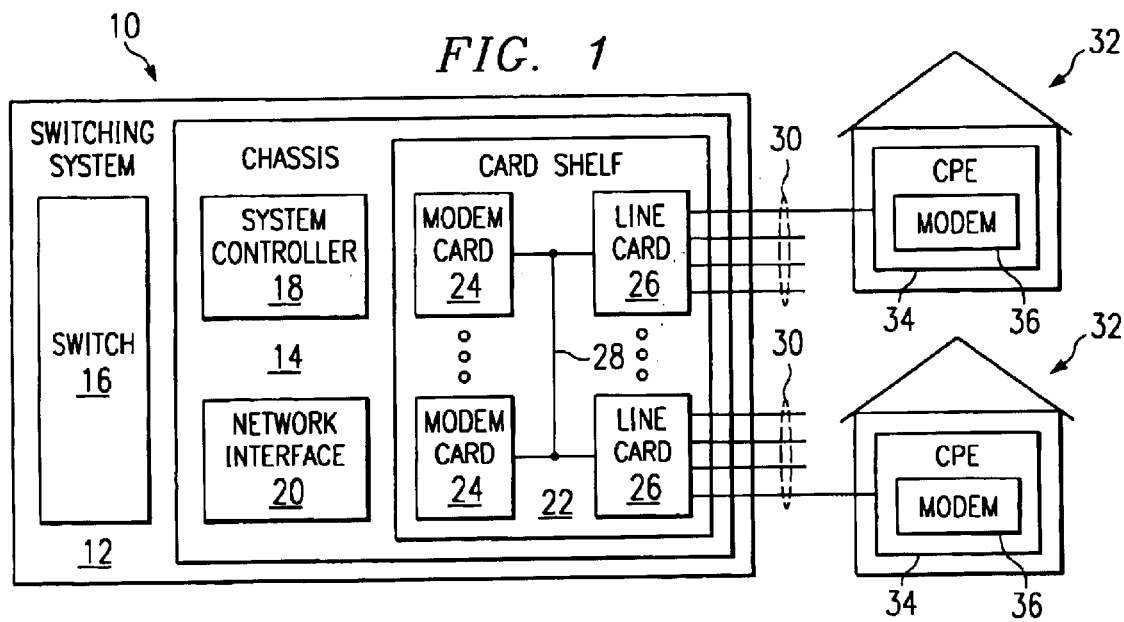
FIG. 1 is a block diagram illustrating a switching system for a telecommunications network in accordance with one embodiment of the present invention.

FIG. 1 is a block diagram illustrating a switching system 12 for a telecommunications network. A telecommunications network is a network that transmits voice, audio, video or other data from one point to another. In accordance with the present invention, the switching system 12 includes a modeling system that models the behavior of network elements in the switching system 12. The modeling system provides the status of the network elements and thus allows resource use and failures to be monitored, logged and analyzed and allows affected operations to be rerouted or switched to back-up elements as necessary.

As described in more detail below, the network elements are modeled by nodes. The network elements may be physical elements, such as equipment, or logical elements, such as business rules implemented in software. The nodes are representative of network elements in that they respond to events and behave in accordance with the network elements. The nodes are associated with each other based on operational dependence of the corresponding network elements such that the nodes react to events in the same manner as the network elements and accurately represent the states of the network elements. Operational dependence may be physical dependence, such as one piece of equipment relying on another for at least part of its operation, or logical dependence, such as a piece of equipment relying on a business rule for at least part of its operation. The modeling of both physical and logical elements and the inclusion of both physical relationships and logical associations allows complete modeling of a system, including the status of all equipment and services.

Referring to FIG. 1, the switching system 12 comprises a chassis system 14 and a telephony switch 16 for processing voice, audio, video or other data communications. The chassis system 14 includes equipment that is connected to customer premises and that transmits and receives data to and from customer premises. The chassis system 14 also monitors and controls operation of the switching system 12.

The telephony switch 16 transmits and receives customer traffic on a network. The telephony switch 16 may be any suitable telecommunications switch capable of routing voice or other data traffic.

The chassis system 14 comprises a system controller 18, a network interface 20, and a plurality of card shelves 22. The network interface 20 includes software and/or hardware that allows the switching system 12 to communicate with other systems over a network.

The system controller 18 controls operation of the switching system 12. The system controller 18 includes a modeling system for modeling the behavior of network elements in the switching system 12. As previously described, the network elements may be physical or logical elements. In either case, the elements are generally self-contained units, each having a specified function. As described in more detail below, behavior is modeled by assigning a node to each network element and associating the nodes with each other in accordance with the relationships between the network elements.

The card shelf 22 includes a plurality of modem cards 24 and a plurality of corresponding line cards 26. Modem cards 24 and line cards 26 may be printed circuit boards that provide modem and line connections for the switching system 12 to customer premises. Modem cards 24 and line cards 26 communicate with each other over a back plane 28. According to one embodiment, each modem card 24 includes two modems, and each line card 26 includes four communication lines 30. For this embodiment, two modem cards 24 including a total of four modems support each line card 26 over the back plane 28. Each line card 26 is connected with up to four remote customer systems 32.

Each remote customer system 32 includes customer premises equipment (CPE) 34 such as a telephone that is coupled to the switching system 12 through a communication line 30. The communication line 30 may be a conventional twisted pair or other suitable cable. The CPE 34 may include a customer modem 36 to allow pocket traffic on a conventional phone line. It will be understood that the switching system 12 may otherwise communicate with customer premises or other suitable remote systems.

Figure 2:
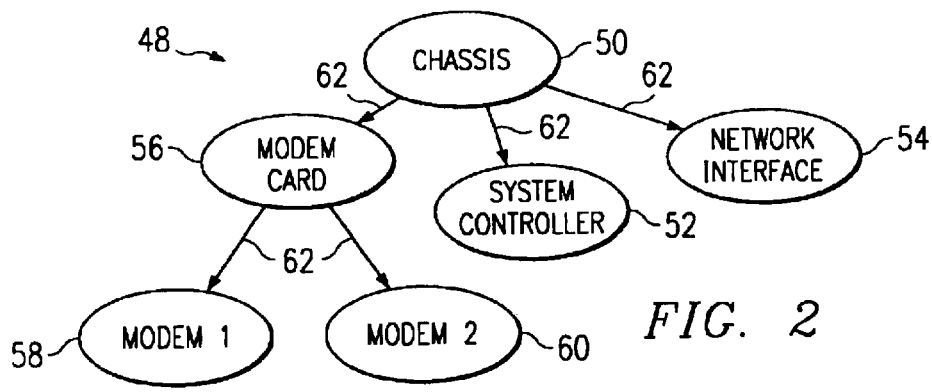
FIG. 2 is a block diagram illustrating a containment cluster of physically associated nodes representative of the physical elements of the switching system of FIG. 1.

FIG. 2 is a block diagram illustrating modeling of the physical elements of the switching system 12. In accordance with previous modeling systems, equipment is modeled by representing each physical element with a node and associating the nodes based on physical dependence of the elements. For example, the operational state of a modem may depend on the state of the modem card on which it resides, with the failure of the modem card necessarily causing a failure of the modem. This physical modeling of elements forms a containment cluster 48.

Referring to FIG. 2, the containment cluster 48 for the switching system 12 includes a chassis node 50 representing the chassis system 14, a system controller node 52 representing the system controller 18, a network interface node 54 representing the network interface 20, a modem card node 56 for each modem card 24, and a separate modem node 58 and 60 for each modem on the modem card 24. The nodes 50, 52, 54, 56, 58 and 60 are associated with each other by containment relationships represented by containment links 62. Each containment link 62 points from a parent node to a child node that is physically dependent on the parent node. A node is physically dependent on a parent node when the physical element represented by the node depends for operation on another physical element represented by the parent node. Thus, the modem card 24, the system controller 18, and the network interface 20 are physically dependent upon the chassis system 14, as indicated by the containment links 62 pointing from the chassis node 50 to the modem card node 56, the system controller node 52, and the network interface node 54. In this embodiment, for example, the chassis system 14 may provide power, environmental controls, and other basic functions to the modem card 24, the system controller 18, and the network interface 20. Similarly, the modems represented by modem nodes 58 and 60 are physically dependent upon the modem card 24 that is represented by modem card node 56.

Each parent node communicates its service state to child nodes through containment links 62. The child nodes then use the parent service state to determine their own service state. As a result, a failure in the service state of a parent node causes its child nodes to redetermine their own service states, and if appropriate, to themselves go to a failure service state.

Containment clusters 48 have limitations that prevent them from fully modeling actual systems. For example, each child node in a containment cluster 48 may have only one parent within the cluster 48. Another limitation of containment clusters 48 is an inability to model non-physical elements and events. Instead, all links in a containment cluster 48 are containment links 62 that represent relatively permanent physical relationships.

Figure 3:
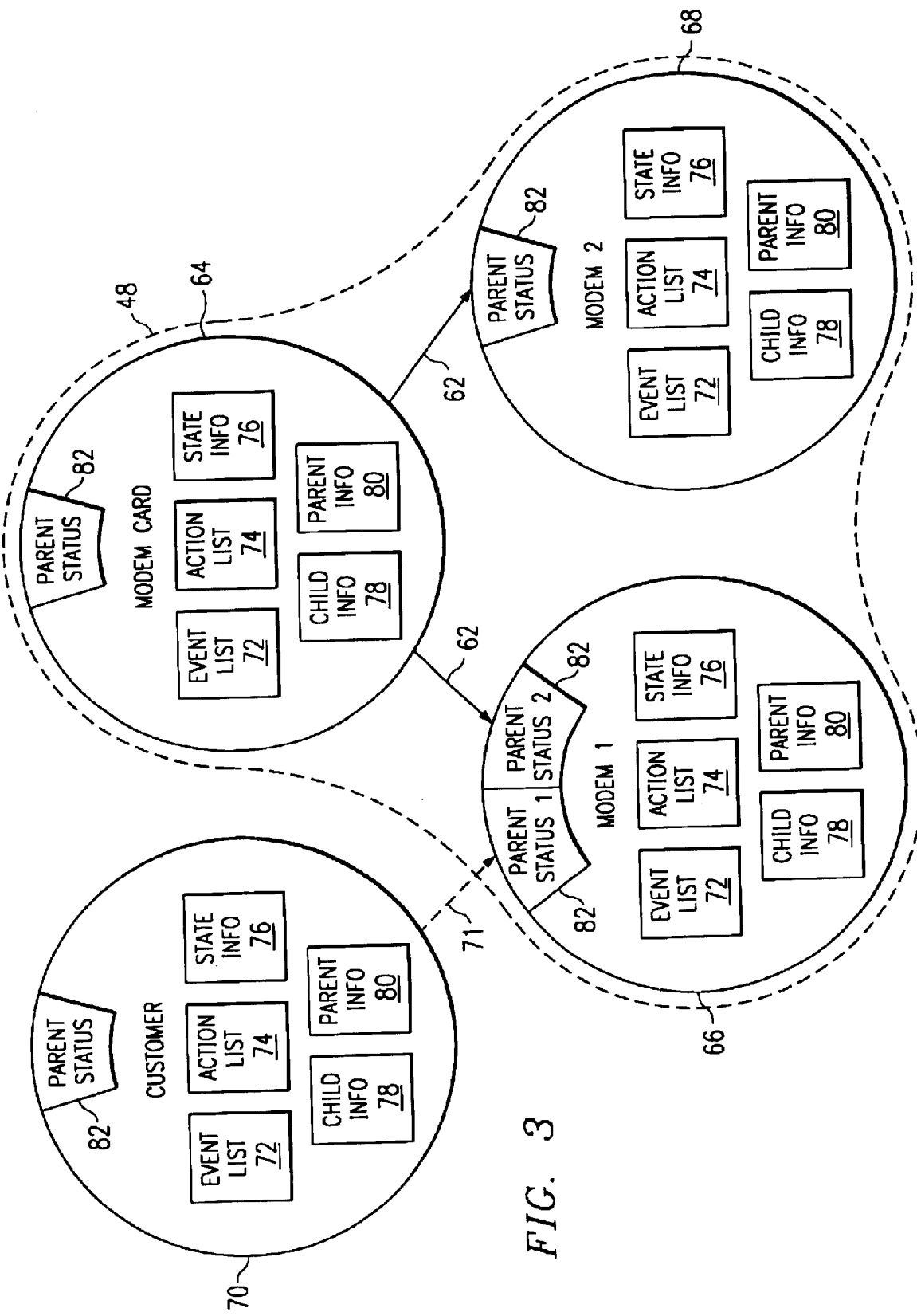
FIG. 3 is a block diagram illustrating dynamic associations and containment relationships in accordance with the present invention.

FIG. 3 is a block diagram illustrating details of nodes in the modeling system in accordance with one embodiment of the present invention. The modeling system includes nodes representing physical elements and physical relationships as in previous systems. In accordance with the present invention, the modeling system further includes logical elements, logical relationships, multiple-parent relationships, and dynamic generation of associations of elements to allow full modeling of a system for an enterprise.

Referring to FIG. 3, the network elements include a modem card 24 represented by a modem card node 64, two modems on the modem card 24 represented by modem nodes 66 and 68, and a customer node 70. As described in more detail below, the customer node 70 is a logical node that may be dynamically generated and linked based on a business or operation rule or other suitable condition. Each of the nodes 64, 66, 68 and 70 shown in FIG. 3 include an event list 72, an action list 74, a state information section 76, a child information section 78, a parent information section 80 and one or more parent status buckets 82. The lists, sections and buckets may be any suitable type of data store.

The event list 72 includes a list of events that affect the node. According to one embodiment, the event list 72 includes state change events that have the potential to change a node's service state. The event list 72 for a particular node may have personalized severities associated with each event in the list 72. This allows each node to have different severities assigned to each event so that the same event will not have the same effect on every node. For example, one specific event may cause one node to go out of service, while allowing another node to remain in service.

The action list 74 includes a list of actions that the node takes in response to corresponding events in the event list 72. As described in more detail below, the actions for the state change events redetermine the state of the node.

The state information section 76 stores the node's service state. According to one embodiment of the present invention, this service state may be a composite state including information regarding whether the node is broken, in service, or in maintenance. The composite state also includes information regarding the service state of any parent of that node. The service state is based on other states in that the other states are taken into account in the determination of the service state. In addition to the node's current service state, the state information section 76 may also store the node's previous service state. This may be used to recognize and act upon changes in: the service state. In another embodiment, a redetermined service state of the node may be compared to the stored service state prior to replacing the stored service state to determine whether a change in state has occurred.

The child information section 78 stores information regarding the maximum number of children the node may have, as well as information regarding the actual children associated with that node. Information about actual children may include each child node's active status, type, instance and whether the child is coupled to the parent through a containment link 62 or a dynamic link 71. The parent information section 80 may store information regarding the maximum number of parents the node may have.

The parent status buckets 82 each store information regarding the service state of a parent node. This allows the behavior of a node to be affected by a plurality of other nodes, which provides more accurate modeling of a system. In addition, both physical relationships and logical associations between network elements may be modeled with any number of parent-child relationships necessary.

While the modem card node 64 and the modem nodes 66 and 68 are associated by containment relationships, indicating that they are physically dependent upon each other, the customer node 70 is dynamically generated and linked to the modem node 66 by a dynamic link 71. This association of the customer node 70 and the modem node 66 represents either a logical association or a temporary physical relationship between the two nodes 70 and 66. The logical relationship is based on a business rule such as disabling equipment that is servicing a non-paying customer, an operation rule such as in a security system, or other suitable conditions that dynamically otherwise occur. The system controller 18 dynamically creates or deletes nodes and makes or breaks these logical associations or temporary physical relationships in response to specified triggering occurrences. For example, in a security system, a triggering occurrence may be movement in a restricted area. The system controller 18, in response to that triggering occurrence, may create an intruder node and make a logical association between the intruder node and a node representing an alarm system. If another triggering occurrence takes place, such as an authorized code being entered into the alarm system, the system controller 18 may then break the association and delete the intruder node.

In generating a dynamic node, the system controller 18 determines an element to be represented in response to a triggering occurrence and generates a node for the element. The node is preferably an instance of a defined object type having a predefined event list 72, action list 74, child information 78, and parent information 80. A library of such objects may be stored in the system controller 18. The system controller 18 then associates the dynamic node by adding a corresponding parent bucket 82 to its children with its service state and adding its identifiers to the child information 78 of its identified parents. In this way, the dynamic node is affected by and affects operations designed within the switching system 12.

Figure 4:
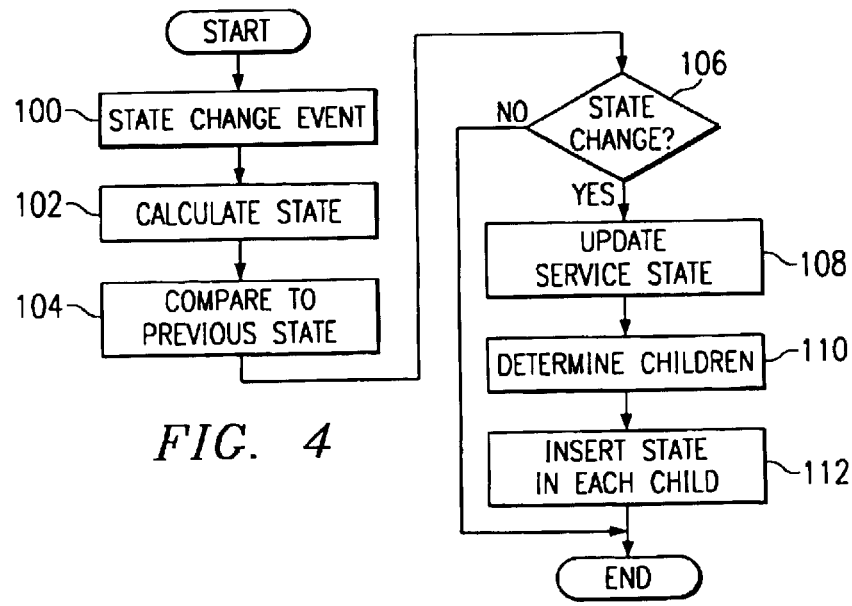
FIG. 4 is a flowchart illustrating a method for updating the status of a node and for propagating any status changes to children of the node.

FIG. 4 is a flowchart illustrating a method for determining whether a node has changed states and propagating any such change to each child node. The method begins at step 100 where a state change event occurs. A state change event is an event that at least has the potential to change that node's service state. In one embodiment, state change events are included in the event list 72 of a node.

After such an event occurs, the node's service state is determined with a rule-based state determiner in step 102. The state determiner may reside in the system controller 18. The state determiner is rule-based in that it utilizes a rule, the service state equation, to determine a node's service state. The state determiner uses the same service state equation for each node. Therefore, changing this one equation changes the way every node's service state is determined.

According to one embodiment, the service state equation is as follows:

$$SS = NB + IS + NIM + \Sigma PS_i,$$

where SS is the "service state," NB is the "broken state," IS is the "in-service state," NIM is the "maintenance state," and PS is the "parent state."

In order for the node to have a service state of "up," indicating that the network element represented by the node is fully operational and functional, every component of the service state equation must be "up." Therefore, when a node is broken, not in service, or in maintenance, the node's service state will be "down." In addition, if any of the node's parent nodes have a service state of "down," the node will also have a service state of "down."

Next, at step 104, the node compares its current service state as determined by the state determiner to its previous service state that existed before the state change event occurred. According to one embodiment, the current service state may be temporarily stored in the system controller's 18 random access memory, where it may be accessed by the node. The previous service state is stored in the node's state information section 76 which is updated only in response to a change. Alternatively, both the current service state and the previous service state may be stored in the node's state information section 76. In this embodiment, the service states are stored in the state information section 76 before the comparison is made by the node.

At decisional step 106, the node determines whether or not a service state change has occurred. If no change in service state has occurred, the node is not affected by the event. Accordingly, no further processing is necessary and the No branch of decisional step 106 leads to the end of the process with no further action.

However, if a service state change has occurred, the Yes branch of decisional step 106 leads to step 108 where the node updates its service state in the state information section 76. As described above, in the embodiment in which the state information section 76 stores both the current service state and the previous service state, these service states would have been updated before the node compared service states in step 104.

Proceeding to step 110, the node determines which other nodes, if any, are its child nodes. The node may determine this information by accessing data in its child information section 78. At step 112, the node inserts its new service state into each child node. This may be accomplished by the node sending its service state along a containment link 62 or a dynamic link 71 into each child node's parent status bucket 82. According to one embodiment, a node that has changed states may also send notification of the state change to an entity other than a child node. After each child node and any other specified entity has received the new service state information, the method comes to an end within the node.

The change in each child node of its parent state, however, causes each child node to repeat the process. Thus, the service state propagates down to each of a parent node's child nodes, the child node's child nodes, and so on. As each child node receives a new parent state, the child node redetermines its own service state. In this way, the entire model is fully responsive to events.

Thus, for example, if a parent node represents a piece of equipment that is broken, any element represented by a child node of that parent node will eventually have a service state of "down," even though that particular element may be otherwise functioning properly. In the same way, if a customer has been delinquent in paying bills, for example, a customer node 70 corresponding to that customer may be placed out of service by changing the IS variable and thus causing the customer node's 70 service state to change from "up" to "down." This "down" state will then be propagated to all child nodes, thus preventing the customer from making further use of any services until the bill is made current.

Similarly, if a parent node represents a piece of equipment that is repaired so that its service state changes from "down" to "up," the parent node will insert its new service state into each of its child nodes. Each of the child nodes will then redetermine its own service state and, for each child that has a new service state, that child will insert its new service state into its child nodes, and so on. However, if a child node of the parent node is itself broken or in maintenance, for example, the child node will simply store the information regarding its new parent node service state and take no further action regarding its child nodes until its service state changes to "up."

Although the present invention has been described with several embodiments, various changes and modifications may be suggested to one skilled in the art. It is intended that the present invention encompass such changes and modifications as fall within the scope of the appended claims.

What is claimed is:

1. A method for modeling behavior of elements in a telecommunications network, comprising:
   providing a node representing a network element, the network element comprising a first physical element of a telecommunications network;
   storing in the node a first service state for the node;
   storing in the node a second service state for a first parent node upon which the node is operationally dependent, the first parent node representing a second physical element of the network on which the first physical element is physically dependent;
   generating a second parent node in response to a triggering occurrence, the second parent node representing a logical element on which the first physical element is logically dependent;
   dynamically associating the second parent node with the node;
   storing in the node a third service state for the second parent node; and
   in response to receiving at least one of a new second service state and a new third service state, redetermining at the node the first service state for the node using a state determiner and at least one of the new second service slate and the new third service state.

2. The method of claim 1, further comprising, in response to the redetermined service state for the node being a new service state for the node:
   determining any child nodes for the node, the child nodes operationally dependent upon the node; and
   inserting the new service state for the node in each child node.

3. The method of claim 2, further comprising redetermining a service state for each child node in response to the new service state for the node being inserted in the child node.

4. The method of claim 1, further comprising:
   storing in the node an operation state for the node; and
   in response to receiving a new operation state, redetermining the service state for the node based on the operation state and the parent service states.

5. The method of claim 4, wherein the operation state is a composite state including at least one of a broken state, an in-service state, and a maintenance state for the node.

6. The method of claim 1, wherein the state determiner comprises a service state equation comprising a variable selected from a group consisting of a service state, a broken state, an in-service state, a maintenance state, and a parent state.

7. A method for modeling behavior of elements in a telecommunications network, comprising:
   providing a node representing a network element, the network element comprising a first physical element of a telecommunications network, the node operationally dependent on a plurality of parent nodes, a first parent node of the plurality of parent nodes representing a second physical element of the network on which the first physical element is physically dependent;
   storing in the node a first service state for the node;
   generating a second parent node in response to a triggering occurrence, the second parent node representing a logical element on which the first physical element is logically dependent, the second parent node included in the plurality of parent nodes;
   dynamically associating the second parent node with the node;
   storing in the node a second service state for each of the plurality of parent nodes upon which the node is operationally dependent; and
   in response to receiving at least one new second service state for at least one of the plurality of parent nodes, dynamically redetermining at the node the first service state for the node using a state determiner and the at least one new second service state for the at least one of the plurality of parent nodes.

8. The method of claim 7, further comprising, in response to the redetermined service state for the node being a new service state for the node:
   determining any child nodes for the node, the child nodes operationally dependent upon the node; and
   inserting the new service state for the node in each child node.

9. The method of claim 8, further comprising redetermining a service state for each child node in response to the new service state for the node being inserted in each child node.

10. The method of claim 7, further comprising:
    storing in the node an operation state for the node; and
    in response to receiving a new operation state, redetermining the service state for the node based on the operation state and the parent service states.

11. The method of claim 10, wherein the operation state is a composite state including at least one of a broken state, an in-service state, and a maintenance state for the node.

12. The method of claim 7, wherein the state determiner comprises a service state equation comprising a variable selected from a group consisting of a service state, a broken state, an in-service state, a maintenance state, and a parent state.

13. A network control system for modeling behavior of elements in a network, comprising:

a node representing a network element, the network element comprising a first physical element of a telecommunications network, the node operationally dependent on a plurality of parent nodes, a first parent node of the plurality of parent nodes representing a second physical element of the network on which the first physical element is physically dependent;

a second parent node generated in response to a triggering occurrence, the second parent node representing a logical element on which the first physical element is logically dependent, the second parent node included in the plurality of parent nodes, the second parent node dynamically associated with the node;

a state store in the node for storing a first service state for the node;

a parent state store in the node for storing second service states for the plurality of parent nodes upon which the node is operationally dependent; and wherein the first service state for the node is dependent upon the second service states of the plurality of parent nodes, the node operable to dynamically redetermine the first service state for the node using a state determiner and at least one new second service state of at least one of the plurality of parent nodes.

14. The system of claim 13, the node further comprising:

a child list including a list of child nodes operationally dependent upon the node; and wherein the node is operable to insert the service state for the node into each of the child nodes in the child list upon a change in the service state for the node.

15. The system of claim 13, further comprising a state determiner operable to redetermine the service state for the node based on the service states for the parent nodes.

16. The system of claim 13, the node further comprising:

an event list including a list of specified events; and an action list including an action to take in response to each event in the event list.

17. The system of claim 16, further comprising:

the event list including a parent state event for a change in the service state for each of the parent nodes;

the action list including a corresponding action of calling a state determiner in response to each parent state event; and the state determiner operable to redetermine the service state for the node based on the service states for the parent nodes.

18. The system of claim 13, wherein the state determiner comprises a service state equation comprising a variable selected from a group consisting of a service state, a broken state, an in-service state, a maintenance state, and a parent state.

* * * * *

UNITED STATES PATENT AND TRADEMARK OFFICE
CERTIFICATE OF CORRECTION

PATENT NO. : 6,874,022 B1
DATED : March 29, 2005
INVENTOR(S) : Anthony J.P. Carew et al.

It is certified that error appears in the above-identified patent and that said Letters Patent is hereby corrected as shown below:

Column 7,
Line 62, delete "slate" and insert -- state --.

Signed and Sealed this

Thirty-first Day of January, 2006

JON W. DUDAS
*Director of the United States Patent and Trademark Office*